United States Patent [19]
O'Melia

[11] 3,911,118

[45] Oct. 7, 1975

[54] NEMATICIDAL METHODS USING SUBSTITUTED PYRIDINYL PHOSPHONAMIDATE, PHOSPHONAMIDOTHIOSTE, PHOSPHORODIAMIDATE AND PHOSPHORODIAMIDO-THIOATE

[75] Inventor: Frances O'Melia, Pleasant Hill, Calif.

[73] Assignee: The Dow Chemical Company, Midland, Mich.

[22] Filed: May 10, 1974

[21] Appl. No.: 468,845

[52] U.S. Cl. .............................................. 424/200
[51] Int. Cl.² ........................................ A01N 9/36
[58] Field of Search... 424/200; 260/294.8 R, 296 R

[56] References Cited
UNITED STATES PATENTS

| | | | |
|---|---|---|---|
| 3,244,586 | 4/1966 | Rigterink | 260/294.8 K |
| 3,743,648 | 7/1973 | Rigterink | 260/294.8 K |

FOREIGN PATENTS OR APPLICATIONS

| | | |
|---|---|---|
| 875,566 | 7/1971 | Canada |

*Primary Examiner*—Jerome D. Goldberg
*Assistant Examiner*—Allen J. Robinson
*Attorney, Agent, or Firm*—Edward E. Schilling; Gary D. Street

[57] ABSTRACT

Soil nematodes are controlled by applying to infested soil effective nematicidal amounts of substituted pyridinyl phosphonamidates, phosphonamidothioates, phosphorodiamidates and phosphorodiamidothioates.

12 Claims, No Drawings

NEMATICIDAL METHODS USING SUBSTITUTED PYRIDINYL PHOSPHONAMIDATE, PHOSPHONAMIDOTHIOSTE, PHOSPHORODIAMIDATE AND PHOSPHORODIAMIDO-THIOATE

SUMMARY OF THE INVENTION

The present invention relates to methods for the control of plant pathogenic nematodes employing as active ingredients certain substituted pyridinyl phosphonamidate, phosphonamidothioate, phosphorodiamidate and phosphorodiamidothioate compounds of the formula:

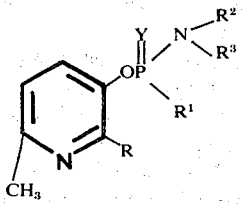

wherein Y represents a chalcogen of atomic number 8 to 16, inclusive; R represents hydrogen or loweralkoxy; $R^1$ represents —NHmethyl, methyl or ethyl; $R^2$ represents hydrogen, methyl or ethyl, and $R^3$ represents methyl or ethyl.

The compounds of the above formula are hereinafter referred to, for convenience, as "active ingredients."

DETAILED DESCRIPTION OF THE INVENTION

The active ingredients employed in the present invention are usually oily liquids or solids at ambient temperatures and are soluble in usual organic carriers such as, for example, carbon tetrachloride, acetone, toluene, methylene chloride, dimethylformamide and the like.

The term "loweralkoxy" as used herein means methoxy, ethocy, propoxy, isopropoxy and the like. The term "chalcogen" as employed in the present specification and claims means those members of the recognized chalcogen group having an atomic number of 8 to 16, inclusive, i.e., oxygen and sulfur.

The active ingredients of the above Formula I wherein Y is sulfur constitute a preferred embodiment in the methods of the present invention. Another preferred class of compounds for use in methods of the present invention includes those wherein R is hydrogen. An additional preferred embodiment includes active ingredients wherein R is alkoxy. A further preferred embodiment includes active ingredients wherein Y is sulfur, $R^1$ is —NHmethyl, R and $R^2$ are each hydrogen and $R^3$ is methyl. In still another preferred embodiment, Y is sulfur, R is alkoxy, $R^1$ and $R^3$ are each methyl and $R^2$ is hydrogen. A preferred compount of the present invention is 0-(6-methyl-3-pyridinyl) N,N'-dimethylphosphorodiamidothioate.

The active ingredients of the present invention are prepared by reacting a selected substituted 3-pyridinol reactant with phosphorochloridate or phosphorochloridothioate and treating the thus formed intermediate with an amine reactant to form the desired substituted pyridinyl phosphorodiamidate or phosphorodiamidothioate. The substituted pyridinyl phosphonamidates and phosphonamidothioates are similarly prepared by employing methyl or ethyl substituted phosphonoic- or phosphonothioi- chloride starting materials. The reaction is usually carried out in the presence of an inert organic carrier medium, such as, for example, benzene, toluene, xylene, acetone, methyl isopropylketone, methyl isobutylketone, acetonitrile, dimethylformamide, methylene chloride and the like.

In carrying out the reaction, the pyridinol reactant is mixed with the carrier medium and an alkaline earth or alkali metal source, e.g., sodium hydroxide, potassium carbonate and the like, to form the salt of the pyridinol reactant. The mixture is then cooled to temperatures of from about 5° to about —10°C. and the phosphorochloridate, phosphorochloridothioate, phosphonochloridate or phosphonochloridothioate reactant added thereto. Generally, equimolar amounts of reactants are employed. The resulting reaction mixture is stirred for a period of from about ½ to 2 hours and then cooled to below about 10°C. The amine reactant, e.g., methylamine or ethylamine, is slcwly added to the cooled reaction mixture. Usually, depending upon the product desired and reactants employed, a two-to-fourfold equimolar amount of the amine addition, the reaction mixture is stirred for a period of from about 1 to about 5 hours at temperatures ranging from about 0°C. to about 25°C. The reaction mixture is then mixed with ice water and the mixture stirred for a period of from about 15 to about 30 minutes. The organic produce layer is then separated, washed, dried over sodium sulfate and filtered. The product layer is distilled to remove the organic carrier and the product recovered as an oil or as a crystalline solid.

In the context of this disclosure, the term "nematicide" is employed to designate a compound that kills, inactivates, repels or otherwise prevents the destructive effects of nematodes, i.e., those members of the phylum Nemata, such as, for example, root know nematodes (*Meloidogyne incognita* var. *acrita*), sugar beet cyst nematodes (*Heterodera schachtii*), and the like.

In use, the active ingredients are applied to areas to be protected from nematodes in any of a variety of formulations and means of application. In applying the active ingredients for nematode control, the active ingredient is of course applied in an amount sufficient to exert the desired control. The required amount, however, will be governed by such variables as method of applications, area of application, time of year, temperatures, moisture, and the like. The active ingredients of the present invention can be applied to areas to be protected from nematodes prior to crop planting. Many of the active ingredients of the present invention are safe to growing plants at well above the necessary use rates and can therefore be used during crop planting and also in certain standing crops.

Compositions of this invention suitable for practical use as nematicides will include one or more active ingredients of Formula I above either individually, in admixture with one another, or in admixture with other pesticides, and can include surface-active agents and inert carriers such as solid or liquid diluents and other inert materials as described to produce wettable powders, suspensions, emulsifiable concentrates, dusts, solutions, granules, petters or high-strength compositions.

In general, good nematicidal results are obtained when the active ingredients of the present invention are distributed through the soil in amounts of from about 0.1 to about 500 parts or more by weight per million parts by weight of soil. In field applications, the active ingredients may be distributed in the soil at a dosage of at least about one-half pound per acre foot of soil and through a cross-section of the soil as to provide for the presence therein of a nematicidal concentration of active ingredient. In such applications, it is desirable that the active ingredient be distributed to a depth of at least 12 inches below the soil surface.

The exact concentration of an active ingredient of Formula I to be employed in compositions for the treatment of growth media may vary provided nematicidal dosages of the active ingredients are supplied. The concentration of active ingredients in liquid compositions employed to supply the desired dosage generally is from about 0.01 to 50 percent by weight although as high a concentration as 90 percent by weight may be employed. In dusts, the effective weight may be from about 1 to 20 percent by weight. In compositions to be employed as concentrates, the active ingredients may be present in a concentration of from about 5 to 95 percent by weight.

Liquid compositions containing the desired amount of active ingredient may be prepared by dispersing the same in an inert diluent such as water of an organic liquid with the aid of a suitable surface-active dispersing agent such as an ionic or non-ionic emulsifying agent. The surface-active dispersing agents are generally employed in the amount of from 1 to 20 percent by weight of the combined weight of the active ingredient and surface active agent in the composition. Suitable organic liquid carriers include acetone, xylene, toluene, isopropanol, polyglycols, chlorinated hydrocarbons such as methylene chloride, carbon tetrachloride, chlorobenzene and the petroleum distillates such as diesel fuel, kerosene, fuel oil, naphthas, and Stoddard solvent. Among the latter, the petroleum distillates boiling almost entirely under 400°F. at atmospheric pressure and having a flash point above 80°F. are generally preferred, however, any suitable liquid carrier or combination of carriers can be employed. The aqueous compositions may contain a small amount of a water-immiscible solvent whereby the carrier comprises an aqueous emulsion, namely, a mixture of water, emulsifying agent and organic liquid. In the liquid compositions, the choice of dispersing and emulsifying agent and the amount thereof employed are dictated by the nature of the composition and by the ability of the agent to facilitate the dispersion of the active ingredient in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredients are dispersed in and on finely divided inert solids such as clay, talc, chalk, gypsum and the like. In such operations, the finely divided carrier is mechanically mixed or ground with the active ingredient. Similarly, dust compositions containing the active ingredients may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc, diatomaceous earth or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the active ingredients of Formula I are dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the active ingredients in soil or growth media may be accomplished by introducing the active ingredients in the water employed to irrigate the soil. The 0- (6-methyl-3-pyridinyl) N,N'-dimethylphosphorodiamidothioate compound is especially effective when employed in this manner with sufficient irrigation water to translocate the compound to a soil depth of 12 or more inches. The amount of water may be varied with the porosity and water-holding capacity of the soil to obtain the desired depth of distribution of the active ingredients.

The following examples illustrate the use of the active ingredients of the present invention.

EXAMPLE 1

Separate acetone solutions containing 50 grams of one of the test ingredients: 0-(6-methyl-3-pyridinyl) N-,N'-dimethylphosphorodiamidothioate, 0-(6-methyl-3-pyridinyl) N-methyl methylphosphonamidothioate and 0-(6-methyl-2-propoxy-3-pyridinyl) N,N'-dimethylphosphorodiamidothioate, respectively, (hereinafter, Compounds A, B and C, respectively) per liter of solution were prepared for the treatment of separate seed beds (150 gram samples) containing sandy loam soil which was heavily infested with root knot nematodes (Meloidogyne incognita). A portion of the soil samples was placed in a container and thereafter treated with the chemical composition. In the treating operations, separate portions of each of the prepared compositions were injected into separate soil samples at various concentrations and the samples mixed to uniformly distribute the test chemical. The soil was then tamped and five cucumber seeds laid on the surface and the remaining treated soil portion added as a cap. Untreated soil samples were also planted with cucumber seeds to serve as checks. The soil samples were then maintained under conditions conducive to growth for a period of 3 weeks. At the end of this growth period, the plants were removed from the soil and the roots washed and examined for evidence of attack by nematodes. Examination of the plants indicated that Compound C gave complete control of nematodes at a concentration of 10.0 parts per million (ppm) by weight of soil while Compound B gave 75% control at application rates of 10.0 and 2.0 ppm, respectively. From an average of two replicates, Compound A was found to give 90, 90 and 50 percent control, respectively, of soil nematodes at application rates of 10.0, 2.0 and 0.4 ppm, respectively, by weight of soil.

EXAMPLE 2

An acetone solution of 0-(6-methyl-3-pyridinyl) N,-

N'-dimethylphosphorodiamidothioate (Compound A) was prepared as in Example 1. Cylindrical plastic tubes, about 1 3/16 inch diameter and about 33½ inch in length, were filled with nematode-infected soil to a height of about 24 inches. The test solutions containing various concentrations of the test ingredient were drenched onto the soil in the soil-filled tubes, which were supported in an upright position to insure proper drainage. In one set of operations (A), 100 milliliters (ml.), equivalent to about 5-acre inches of water, were applied at one time to certain of the soil-filled tubes. In another set of operations (B), 10 ml. of test solution (about one-half acre inch of water) were applied to soil-filled tubes and 1-acre inch of water (20 ml.) added thereto on each of the five following days. All tubes, including untreated control tubes, were incubated for a period one week following the initial application of test solution in Operation A and following the last addition of water in Operation B. After such periods, the soil-filled tubes were laid horizontal, the top one-half of the longitudinal surface of each tube was removed, thereby exposing entire length of the soil column. The soil column was then cut into sequential three-inch increments (e.g., increments of 0–3, 3–6, 6–9 and the like) and the increments were placed into a pot and planted with cucumber seeds. Three weeks after planting, the cucumber plant roots were exposed, washed, and evaluated for nematode control. In operation A, the 0-(6-methyl-3-pyridinyl) N,N'-dimethylphosphorodiamidothioate test ingredient was found to give from about 83 to 100% control of nematodes in all increment samples from the initial surface sample (0–3 inch) down through the 12–15 inch increment sample and 50% control of nematodes in the 15–18 inch increment at a dosage rate of 10 pounds per surface acre. At a dosage rate of 2.5 pounds per surface acre, the same test ingredient gave from 75 to 100 percent control of nematodes in all increments through the 15–18 inch increment. In Operation B, the test ingredient was found to give from 88 to 100% control of nematodes in all increment samples from the surface sample down through the 12 – 15 inch increment and 63% control in the 15 – 18 inch increment at a dosage rate of 10.0 pounds per acre. At a dosage rate of 2.5 pounds per acre, good control was achieved only through the 6 – 9 inch increment The foregoing data indicate the excellent soil movement and resulting high soil depth activity of the 0-(6-methyl-3-pyridinyl) N,N'-dimethylphosphorodiamidothioate compound when applied with high initial amounts of irrigation water.

The following examples illustrate the preparation of active ingredients of the above Formula I which are employed in the methods of the present invention.

EXAMPLE 3

3-Hydroxy-6-methylphyridine (16.4 grams; 0.15 mole) and 50% sodium hydroxide (12.0 grams; 0.15 mole) were mixed with 300 milliliters (ml.) of methyl isobutylketone and the resulting mixture stirred and heated at reflux temperatures to distill off any water present. The mixture was then cooled to about −6°C. in a salt water ice bath and $PSCl_3$ (25.5 grams; 0.15 mole) was added thereto. An exotherm to about 8°C. resulted. The mixture was stirred for about 90 minutes at a temperature of about −4°C. and methylamine (18.6 grams; 0.60 mole) was then bubbled into the reaction mixture over a period of about 1 hour. The mixture was then stirred for about 2 hours in an ice bath then allowed to stand for about 15 hours. About 200 ml. of ice water were then added to the reaction mixture and the mixture was stirred for about 30 minutes. The organic product layer was separated from the aqueous layer and further washed with about three 125 ml. portions of water. The product layer was then treated with 200 ml of a 2% sodium hydroxide solution for a period of about 15 minutes and the product layer again separated from the aqueous layer and washed with three additional 100 ml. portions of water. Following the separation of the organic product layer from the aqueous portion of the mixture, the product layer was dried over sodium sulfate, filtered and distilled at a temperature of 100°C. at 0.4 millimeters of mercury. The amber liquid thus obtained yielded a crystalline precipitate on standing. As a result of such operations, the desired 0-(6-methyl-3-pyridinyl) N,N'-dimethylphosphorodiamidothioate product was obtained as a crystalline solid melting at 58°–63°C.

EXAMPLE 4

6-Methyl-3-pyridinol (11.0 grams; 0.1 mole) and methylphosphonothioic dichloride (15.0 grams) were mixed with 250 ml. of methylene chloride and the resulting reaction mixture was stirred and cooled in an ice bath. Triethylamine (11.0 grams) was added dropwise to the reaction mixture at a rate calculated to maintain the reaction mixture temperature below about 5°C. Following the completion of the triethylamine addition, the reaction mixture was stirred for a period of about 4 hours at ambient temperatures. After this period, 200 ml. of ice water were added to the reaction mixture, which was then stirred for a period of about 15 minutes. The organic product layer was then separated from the aqueous mixture and stirred with 200 ml. of a 2% sodium hydroxide solution for about 15 minutes. The organic product layer was again separated, washed with two 200 ml. portions of water, again separated and dried over sodium sulfate. The organic product layer was then filtered and distilled under reduced pressure until substantially all of the methylene chloride was removed. As a result of such operations, the desired 0-(6-methyl-3-pyridinyl) N-methyl methylophosphonamidothioate was obtained as an oil having a refractive index $n_D^{25\ C.} = 1.5704$.

Other active ingredients of the present invention are similarly prepared according to the teachings of the specification and the foregoing examples by employing the appropriate substituted pyridinol and substituted phosphorochloridate or chloridothioate or phosphonoic- or phosphonothioc- chloride reactants. Such other products include, inter alia, the following:

0-(6-methyl-2-propoxy-3-pyridinyl) N,N'-dimethylphosphorodiaminothioate, having a refractive index $n_D^{25\ C.} = 1.5442$;

0-(6-methyl-3-pyridinyl) N,N'-dimethylphosphorodiamidate;

0-(2-methoxy-6-methyl-3-phyridinyl) N-methyl N'-ethylphosphorodiamidothioate;

0-(6-methyl-3-pyridinyl) N-methyl N'-dimethylphosphorodiamidate;

0-(6-methyl-3-pyridinyl) N-methyl N'-diethylphosphorodiamidothioate;

0-(6-methyl-3-pyridinyl) N-methyl ethylphosphonamidate;

0-(2-ethoxy-6-methyl-3-pyridinyl) N-dimethylethylphosphonamidothioate, and 0-(6-methyl-3-pyridinyl) N-diethyl methylphosphonamidate.

The reactants employed in preparing the active ingredients of the present invention are readily available or can be prepared according to known procedures.

What is claimed is:

1. A method for the control of nematodes in soil comprising applying to said nematode infested soil a nematicidal amount of a substituted pyridinyl compound corresponding to the following formula:

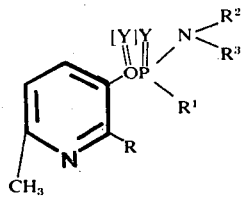

wherein Y represents a chalcogen of atomic number 8 to 16, inclusive; R represents hydrogen, methoxy, ethoxy, propoxy or isopropoxy; $R^1$ represents —NH-methyl, methyl or ethyl; $R^2$ represents hydrogen, methyl or ethyl, and $R^3$ represents methyl or ethyl.

2. The method of claim 1 wherein the compound is applied in an amount sufficient to provide a rate of at least about one-half pound of compound per acre foot of soil.

3. The method of claim 1 wherein said compound is applied to soil in irrigation water.

4. The method of claim 3 wherein the compound is 0-(6-methyl-3-pyridinyl) N,N'-dimethylphosphorodiamidothioate.

5. The method of claim 1 wherein, in said compound, Y is a chalcogen of atomic number 16.

6. The method of claim 5 wherein, in said compound, R is hydrogen.

7. The method of claim 1 wherein, in said compound, R is hydrogen.

8. The method of claim 1 wherein, in said compound, R is methoxy, ethoxy, propoxy or isopropoxy.

9. The method of claim 8 wherein, in said compound, $R^1$ and $R^3$ are each methyl and $R^2$ is hydrogen.

10. The method of claim 1 wherein the compound is 0-(6-methyl-3-pyridinyl) N,N'-dimethylphosphorodiamidothioate.

11. The method of claim 1 wherein the compound is 0-(6-methyl-3-pyridinyl) N-methyl methylphosphonamidothioate.

12. The method of claim 1 wherein the compound is 0-(6-methyl-2-propoxy-3-pyridinyl) N,N'-dimethylphosphorodiamidothioate.

* * * * *

UNITED STATES PATENT AND TRADEMARK OFFICE
CERTIFICATE OF CORRECTION

PATENT NO. : 3,911,118
DATED : October 7, 1975
INVENTOR(S) : Frances O'Melia

It is certified that error appears in the above-identified patent and that said Letters Patent are hereby corrected as shown below:

In the title, correct the spelling of "Phosphonamidothioate";

Column 1, line 40, correct the spelling of "ethoxy";

Column 1, line 56, correct the spelling of "compound";

Column 2, line 21, insert the following between "amine" and "addition": -- reactant is employed. Following the completion of the amine --;

Column 2, line 26, correct spelling of "product";

Column 2, line 35, correct spelling of "knot";

Column 3, line 23, change "of" to -- or --;

Column 5, line 58, correct spelling of "methylpyridine";

Column 6, line 46, correct spelling of "methylphosphonamidothioate";

Column 6, line 53, correct spelling of "phosphonothioic-";

Column 6, line 61, correct spelling of "pyridinyl";

Signed and Sealed this thirteenth Day of April 1976

[SEAL]

Attest:

RUTH C. MASON
*Attesting Officer*

C. MARSHALL DANN
*Commissioner of Patents and Trademarks*